United States Patent  [10] Patent No.: US 8,122,637 B2
Blotsky  [45] Date of Patent: Feb. 28, 2012

(54) ECOSYSTEM AND APPARATUS TO INCREASE CROP YIELD BY TREATING AGRICULTURAL LAND WITH ALGAL BY-PRODUCTS

(75) Inventor: Roger D. Blotsky, Goodyear, AZ (US)

(73) Assignee: Core Intellectual Properties Holdings, LLC, Goodyear, AZ (US)

( * ) Notice: Subject to any disclaimer, the term of this patent is extended or adjusted under 35 U.S.C. 154(b) by 85 days.

(21) Appl. No.: 12/798,194

(22) Filed: Mar. 31, 2010

(65) Prior Publication Data
US 2010/0242355 A1    Sep. 30, 2010

Related U.S. Application Data

(60) Provisional application No. 61/211,501, filed on Mar. 31, 2009.

(51) Int. Cl.
A01G 7/00 (2006.01)
A01G 31/00 (2006.01)
A01H 13/00 (2006.01)

(52) U.S. Cl. .......................... 47/1.4; 47/62 R

(58) Field of Classification Search ............... 47/1.4, 47/62 R; 435/257.1; *A01G 31/00, 7/00; A01K 7/00; A01H 13/00*
See application file for complete search history.

(56) References Cited

U.S. PATENT DOCUMENTS
3,521,400 A * 7/1970 Ort .................................. 47/1.4
(Continued)

*Primary Examiner* — Son T Nguyen
*Assistant Examiner* — Thien Thanh Pham
(74) *Attorney, Agent, or Firm* — Ballard Spahr LLP

(57) ABSTRACT

A method to improve the yield of an acre of a crop having a growing season of less than one year. The method includes the steps of providing an irrigation system for the crop, providing an ecosystem producing algal by-products, and applying the algal by-crop to the crop with irrigation water.

1 Claim, 1 Drawing Sheet

U.S. PATENT DOCUMENTS

| | | | |
|---|---|---|---|
| 3,955,318 A | * | 5/1976 | Hulls ................................ 47/1.4 |
| 4,086,161 A | * | 4/1978 | Burton ........................... 210/602 |
| 5,097,795 A | * | 3/1992 | Adey ............................. 119/262 |
| 5,536,398 A | * | 7/1996 | Reinke ..................... 210/167.22 |
| 5,778,823 A | * | 7/1998 | Adey et al. ..................... 119/215 |
| 5,820,759 A | * | 10/1998 | Stewart et al. ................. 210/602 |
| 7,850,848 B2 | * | 12/2010 | Limcaco ....................... 210/602 |

\* cited by examiner

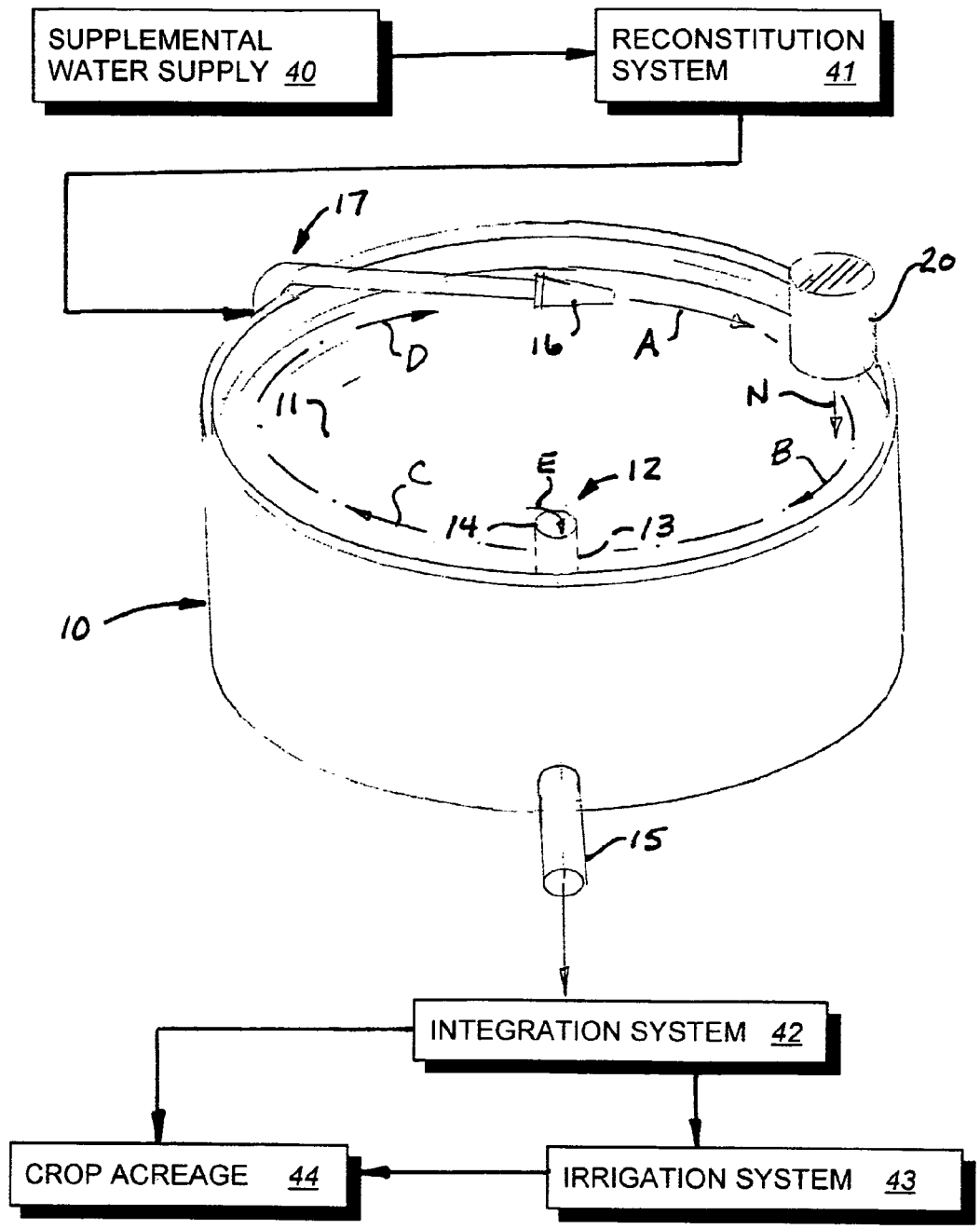

ECOSYSTEM AND APPARATUS TO INCREASE CROP YIELD BY TREATING AGRICULTURAL LAND WITH ALGAL BY-PRODUCTS

This application claims priority based on provisional application 61/211,501, filed Mar. 31, 2009.

This invention relates to an ecosystem and apparatus for improving the yield of a crop.

An object of the invention is to provide an improved ecosystem and apparatus to increase the yield of a crop.

This and other and further objects of the invention will be apparent to those skilled in the art from the following detailed description thereof, taken in conjunction with the drawing, in which FIG. 1 is a perspective view illustrating apparatus constructed in accordance with the principles of the invention.

Briefly, in accordance with the invention, I provide a method to improve the yield of an acre of a crop having a growing season of less than one year. The method comprises the steps of providing an irrigation system to direct irrigation water on to the acre of the crop; providing an integration system to introduce a composition into the irrigation water; and, providing an ecosystem to produce algal by products. The ecosystem includes a tank located out doors in an ambient temperature equal to or greater than sixty degrees Fahrenheit, a volume of water in the tank to a depth in the range of twelve to thirty inches, the volume of water including an upper horizontally oriented surface; at least one species of living algae in the volume of water; at least one species of living bacteria coexisting with the algae in the volume of water; and, a nutrient input system to meter a liquid algal nutrient composition into the water during the day at a rate in the range of 0.001 to 0.05 ounces of nutrient composition per cubic foot of water in the volume of water. The nutrient composition includes 6% tp 15% by weight nitrogen; 5% to 35% by weight carbon; 1% to 6% by weight potassium; and 1% to 6% by weight phosphorous. The ecosystem also includes an algal by-product removal system including a vertically oriented drain tube construct. The drain tube construct includes an open distal upper end positioned at the surface of the volume of water to skim an aqueous solution of algal by-products from the surface; and, an open proximate upper end positioned below the distal upper end and exterior of the tank. The ecosystem also includes a water replenishing system. The water replenishing system includes a supply of supplemental water; a nozzle positioned to deliver the supplemental water into the volume of water, and a reconstitution system. The reconstitution system pressurizes the supply of supplemental water to force the supplemental water out the nozzle into the tank at a rate in the range of two to twenty gallons per hour to produce a current in the volume of water moving at a speed in the range of one-half to two miles an hour; to produce a generally circular flow pattern for the current in the tank, the flow pattern moving past the upper distal end of the algal by-product removal system; and, to produce two to twenty gallons per hour of the aqueous solution of algal by-products to be skimmed by the algal by-product removal system. The method also includes the steps of metering during daylight hours with the nutrient input system 0.001 to 0.05 ounces of nutrient composition per cubic foot of water in the volume of water; and, injecting during daylight hours with the reconstitution system the supplemental water into the volume of water at a rate in the range of two to twenty gallons per hour to produce a current in the volume of water moving at a speed in the range of one-half to two miles an hour; to produce a generally circular flow pattern for the current in the tank, the flow pattern moving past the upper distal end of the algal by-product removal system, and to produce two to twenty gallons per hour of the aqueous solution of algal by-products to be skimmed by the algal by-product removal system. The method also includes the steps of skimming during daylight hours with the algal by-product removal system two to twenty gallons per hour of the aqueous solution of algal by-products; and, applying 250 to 400 gallons of the aqueous solution of algal by-products to the acre of crop by utilizing the integration system to introduce the aqueous solution of algal by-products into irrigation water.

One current embodiment of the system utilizes a cylindrical open-top tank 10 that has a diameter of ten feet and a depth of two feet, although it is understood that the shape and dimension of the tank can vary as desired. The tank can, if desired, include a transparent cover. The tank 10 is preferably located out-of-doors in an ambient temperature equal to or greater than sixty degrees Fahrenheit.

The tank 10 is filled nearly to the top with water. The water has an upper surface 11. The water is charged with living algae. Also in the water in the tank are live anerobic or aerobic bacteria that co-exist with the algae.

Algae are a diverse group of eucaryotic microorganisms that contain a nucleus enclosed within a well-defined nuclear membrane. Algae typically are autotrophic and, accordingly, derive cell carbon from inorganic carbon dioxide. Algae are also photosynthetic (derive energy for cell synthesis from light), and contain chlorophyll. The photosynthesis utilized by algae converts simple inorganic nutrients into more complex organic molecules and produces reduced forms of organic matter comprising a biomass containing high-energy bonds made with hydrogen and carbon, nitrogen, sulfur, and phosphorus compounds. Such organic matter can serve as an energy source for non-photosynthetic or heterotrophic organisms including most bacteria.

The most limiting factor for algal growth is light, followed by nitrogen and phosphorus limitations. The intensity, duration, and quality of light influence algal growth, as does water temperature. When sunlight is relied on, it in general effectively penetrates and is utilized by algae located in only the upper four to five inches of a body of water.

A nutrient mix is continuously or periodically administered into the water in the tank to facilitate growth of the algae. Any aerobic or anaerobic species of algae or combination thereof can be utilized, but species such as chlorella, spirilina and other naturally occurring species are presently utilized. The proportion of lipids or enzymes or proteins or other algal by-products can vary as desired. Occasional infestations of "water fleas" and other insects are treated with sodium hypochlorite to eliminate the insects that ingest and digest algae.

The nutrient mixture can vary as desired. As noted, nutrients critical to algal growth usually include phosphorus or nitrogen. Other elements can include carbon and silicon, calcium magnesium, sodium, potassium, and sulfur. Micronutrients are nutrients required in very small quantities by algae and other plants and can include manganese, copper, zinc, cobalt, and molybdenum. The amount of nitrogen in the nutrient mixture is preferably in the range of six to fifteen percent by weight; the amount of carbon in the nutrient mixture is preferably in the range of five to thirty five percent by weight, the amount of potassium is in the range of one to six percent by weight, and the amount of phosphorous is in the range of one to six percent by weight.

The most typical frequency at which nutrients are administered to water in a tank is three times daily. Nutrient input system 20 manually or automatically meters a nutrient composition into water in tank 10 continuously or a selected number times each day, normally during daylight hours. A total of four ounces a day of a nutrient composition is typically administered each day during daylight hours; although the amount of a nutrient composition administered each day during daylight can be in the range of one to sixteen ounces. During a day long period of time, the ounces of nutrient composition administered per cubic foot of water in a tank 10 is in the range of 0.001 to 0.05 ounce per cubic foot of water in the tank. The amount and frequency with which nutrients are administered can vary depending on temperature, light intensity, and agitation levels. For example, greater quantities of a nutrient composition are administered during warm weather than are administered during cold weather. A nutrient composition can be administered in liquid or solid form, although a liquid in the form of an aqueous solution is preferred for ease of dispersal, consistent application and homogeneity of nutrients.

The tank includes an algal by-product removal system including a drain tube or skimmer (the shape and dimension and construction of which can vary as desired) comprising a hollow drain/skimmer tube 12 with a vertically oriented portion 13 with an open distal upper end with a circular opening 14 located at the surface 11 of the water in the tank. The algal by-product removal system also includes an open proximate lower end 15 positioned below the distal upper end and exterior of tank 10. The lower end 15 can lead to a storage tank or can lead directly into an integration system 42 which functions to admix algal by-product removed from the surface of water in tank 10 with water in an irrigation system 43. The integration system 42 can be constructed in any desired manner and can include a storage tank from which algal by-product is pumped or removed to be admixed with irrigation water in an irrigation system 43, can include a pump which directly pumps algal by-product into an irrigation system 43, or, can include a system to spray algal by-product onto irrigation water that is traveling to or is already distributed on crop acreage 44 via an irrigation system 43.

The drain tube 12 extends downwardly from said upper open end, through the body of water in the tank 10, and out through the bottom or side of the tank.

The upper open end of the tube and circular opening 14 are positioned toward a first side of the circular surface 11 of the body of water. Located at and above a second side of the surface of the body of water is a input nozzle 16. Nozzle 16 can be located above, at, or beneath surface 11. Nozzle 16 is part of a water replenishing system that includes a supplemental water supply 40 and reconstitution system 41. Nozzle 16 directs into tank 10—preferably continuously and along a path (indicated by arrow A in FIG. 1) that is canted with respect to the surface of the body of water, that is initially tangential to the circular periphery of the tank—a small current-generating stream of water that functions to create a slow movement of water or current or circulation that travels in a generally circular path (indicated by arrows B, C, D) around the outer portion of the surface 11 of the body of water. As this current approaches the circular opening 14, lipids and enzymes and proteins and other by-products produced by the algae travel into the circular openings of the drain tube and are effectively skimmed off the surface of the body of water in the tank. Such by-products tend to rise to the surface 11. These algal by-products travel down drain tube 12 and out end 15 to integration system 42. The circular opening 14 of the drain tube, in addition to skimming algal by-products, also skims some algae from the surface 11. The circular current produced by the current-generating water stream from nozzle 16 serves a mixing/blending function by producing a gentle turbulent or rolling action in water located adjacent the current. The rolling action can, in some cases, function to carry individual algae cells close to the water surface to expose them to sunlight and to allow the cells to release readily oxygen that the cells produce. The rolling actions also aids in contacting algae with nutrients in the water. While a circular tank is preferred in generating a circular current, tanks with other shapes can, as noted, be utilized. The circular current B, C, D preferably moves at a speed of from one-half to two miles per hour. A slow moving current has the added benefit of minimizing cell injury or rupturing. The water replenishing system introduces supplemental water into tank 10 at a rate in the range of two to twenty gallons per hour. The gallons per hour of water skimmed into opening 14 in the manner indicated by arrow E in FIG. 1 is generally equivalent to the gallons per hour of supplemental water introduced into tank 10 by the replenishing system.

Nozzle 17 is preferably, but not necessarily, located on a first side of the surface 11 of the body of water in tank 10 while opening 14 is located on a second side of surface 11 that is opposite from said first side of the surface 11.

More than one water stream can be directed at the surface of water in the tank. One or more sub-surface water streams can be utilized in conjunction with or in place of the water streams which is produced by a nozzle positioned at a point above or at the surface 11 of the water.

In one embodiment of the invention, sub-surface turbulence is produced that creates turbulence that substantially diminishes before reaches the surface of water in the tank.

The shape and dimension of the circular opening in the end of the drain tube can vary as desired, but for a tank with a ten foot diameter, the opening presently has a diameter in the range of two to five inches.

The rate at which the input nozzle directs water into the tank can also vary as desired, but the input nozzle presently directs water into the tank at a rate which, as earlier noted, permits two to twenty gallons per hour of a water to travel from the surface 11 of the water in the ten foot diameter tank into the circular opening 14 in the upper end of the drain tube 12. Consequently, the ten foot diameter tank typically produces during a eight hours of daylight sixteen to 160 gallons of aqueous algal by-product.

Algal by-product skimmed from surface 11 can be stored for up to approximately forty-five days.

Pumps ordinarily are utilized to move algal by-product from the ten foot diameter tank into storage or into drip and center pivot irrigation systems. If the algal by-product stored, pumps are utilized to move algal by-product from storage into drip and center pivot irrigation systems.

It is presently preferred that 250 to 400 gallons, preferably 300 to 350 gallons, of algal by-product be applied per acre during a crop growing season, although up to 1000 gallons per acre per growing season normally can be applied without the possibility of detrimental effects on a crop. Algal by-product is preferably applied to a field each time the field is irrigated, and is admixed with irrigation water, although it is possible to spray algal by-product separately onto crop acreage. Most crop growing seasons are less than a year. As used herein, a crop growing season normally consists of the time period from when seeds or seedlings are placed in the ground until the crop is harvested. In the case of fruit trees or other perennials, the season typically extends from when the trees blossom until the fruit is harvested from the trees.

Irrigation water into which algal by-products are administered should not have significant amounts of herbicides, pesticides, sodium hypochlorite, sulfuric acid, and chemical nitrogen, phosphorous and potassium fertilizers.

A ten foot diameter tank typically produces a quantity of algal by-product sufficient to treat 160 acres.

A ten foot diameter tank can, as noted, include a transparent cover which permits sunlight to pass through the cover and contact and penetrate surface 11. The surface of the water in the tank is, however, preferably open to the ambient air so that sunlight directly contacts the surface of the water. Artificial light is not utilized.

The algal ecosystem in the tank produces algal by-products over a wide range of ambient temperatures. Practically speaking, however, the algal ecosystem is utilized at temperatures above freezing because crop fields normally are irrigated while crops are being grown in the fields. The preferred ambient temperature is in the range of 60 degrees F. to 110 degrees F., preferably 80 degrees F. to 100 degrees F.

In use, the algal ecosystem is used at a plurality of separate, remote sites which are adjacent crop fields and which permits algal by-product to be produced, and if necessary stored, adjacent crop fields to be injected into irrigation water that is dispersed over the crop fields. Algal by-product is not trucked from a production site to a crop field. Such an "on-site" dispersion of algal ecosystems makes the system economically practical.

It today is common practice for framers to apply to crop fields 1,000 to 4,000 pounds per acre of NPK (nitrogen-phosphorous-potassium?) fertilizers.

It has been common practice for over ten years for farmers to apply to crop fields 1,000 to 4,000 pounds of NPK fertilizers per acre.

It has been known for over thirty years that applying 1,000 or more pounds per acre of NPK fertilizers kills bacteria colonies in the soil that are important in growing crops in the soil.

It has been known for over thirty years that killing bacterial colonies in the soil makes way for diseases that can penetrate crops grown in the soil and produce illness in human beings that eat such crops.

It has been known for over thirty years that salts are a by-product of NPK fertilizers.

It has been known for over thirty years that fertilizer produced salt in the soil functions to bind interstitial particles of clay to prevent water from percolating through the clay.

It has been known for over thirty years that applying 1,000 or more pounds per acre of NPK fertilizers exterminates a large majority of earthworms in the soil.

It has been known for over thirty years that earthworms perform the critical functions of aerating the soil, facilitating the growth and health of bacteria colonies in the soil, and facilitating mineral content in soil.

It has been known for over thirty years that salt buildup in soil in crop fields reduces the seed germination rate.

At this time a seed germination rate of 65% to 70% in crop fields occurs in the majority of cases.

At this time approximately 10% of crop fields are inactive world-wide because of salt buildup in the soil in the fields.

The dominant trend in the market for over thirty years is to apply 500 to 4,000 lbs per acre of NPK fertilizers for each crop cycle.

The dominant trend in the market for over thirty years is to kill the large majority of earthworms in a crop field by applying fertilizers and pesticides.

The dominant trend in the market for over thirty years is to continue increasing the concentration of salts in crop fields by applying NPK fertilizers.

The dominant trend in the market for over thirty years is to continue reducing the ability of water to percolate through soil in crop fields by applying NPK fertilizers.

The dominant trend in the market for over thirty years is to continue reducing the number of crop—supportive bacteria colonies in soil in crop fields by applying NPK fertilizers.

The dominant trend in the market for over thirty years is to continue reducing the number of crop—supportive bacteria colonies in soil in crop fields by applying pesticides.

In one embodiment of the invention, a kit for producing and applying algal by-products is prepared and sold to a farmer or other end user. The kit typically includes a first tank, a nutrient dispenser mounted on the tank, at least one water nozzle mounted on the tank to direct into the water reservoir in the tank a current—generating stream of water from a location above or below the surface of the water, a quantity of "starter" algae, a nutrient supply, and a second tank in which to store algal by-products. The kit can also include conduit for interconnecting the tank to a water supply, conduit to interconnect the first tank and the second storage tank, and one or more pumps to provide motive power to transport algal by-products.

Having described my invention and the presently preferred embodiments thereof in a manner sufficient for one of ordinary skill in the art to understand and practice the invention, I Claim:

1. A method to improve the yield of an acre of a crop having a growing season of less than one year, comprising the steps of
   (a) providing an irrigation system to direct irrigation water on to the acre of the crop;
   (b) providing an integration system to introduce a composition into said irrigation system;
   (c) providing an ecosystem to produce algal by products, said ecosystem including
      (i) a tank located out doors in an ambient temperature equal to or greater than sixty degrees Fahrenheit,
      (ii) a volume of water in the tank to a depth in the range of twelve to thirty inches, said volume of water including an upper horizontally oriented surface,
      (iii) at least one species of living algae in said volume of water,
      (iv) at least one species of living bacteria coexisting with said algae in said volume of water,
      (v) a nutrient input system to meter a liquid algal nutrient composition into the water during the day at a rate in the range of 0.001 to 0.05 ounces of nutrient composition per cubic foot of water in said volume of water, said nutrient composition including
         (1) 6% to 15% by weight nitrogen,
         (2) 5% to 35% by weight carbon,
         (3) 1% to 6% by weight potassium, and
         (4) 1% to 6% by weight phosphorous,
      (vi) an algal by-product removal system including a vertically oriented drain tube construct having
         (1) an open distal upper end positioned at said surface of said volume of water to skim an aqueous solution of algal by-products from said surface, and
         (2) an open proximate upper end positioned below said distal upper end and exterior of said tank,
      (vii) a water replenishing system including
         (1) a supply of supplemental water,
         (2) a nozzle positioned to deliver said supplemental water into said volume of water, and
         (3) a reconstitution system to pressurize said supply to force said supplemental water out said nozzle into said tank at a rate in the range of two to twenty gallons per hour to produce
- a current in said volume of water moving at a speed in the range of one-half to two miles an hour,
- a generally circular flow pattern for said current in said tank, said flow pattern moving past said upper distal end of said algal by-product removal system, and,
- two to twenty gallons per hour of said aqueous solution of algal by-products to be skimmed by said algal by-product removal system;

(d) metering during daylight hours with said nutrient input system 0.001 to 0.05 ounces of nutrient composition per cubic foot of water in said volume of water;

(e) injecting during daylight hours with said reconstitution system said supplemental water into said volume of water at a rate in the range of two to twenty gallons per hour to produce
- (i) a current in said volume of water moving at a speed in the range of one-half to two miles an hour,
- (ii) a generally circular flow pattern for said current in said tank, said flow pattern moving past said upper distal end of said algal by-product removal system, and,
- (iii) two to twenty gallons per hour of said aqueous solution of algal by-products to be skimmed by said algal by-product removal system;

(f) skimming during daylight hours with said algal by-product removal system two to twenty gallons per hour of said aqueous solution of algal by-products; and, (g) applying 250 to 400 gallons of said aqueous solution of algal by-products to the acre of crop by utilizing said integration system to introduce said aqueous solution of algal by-products into said irrigation water.

* * * * *